(No Model.) 3 Sheets—Sheet 2.
A. W. DUNN.
BICYCLE.
No. 478,156. Patented July 5, 1892.
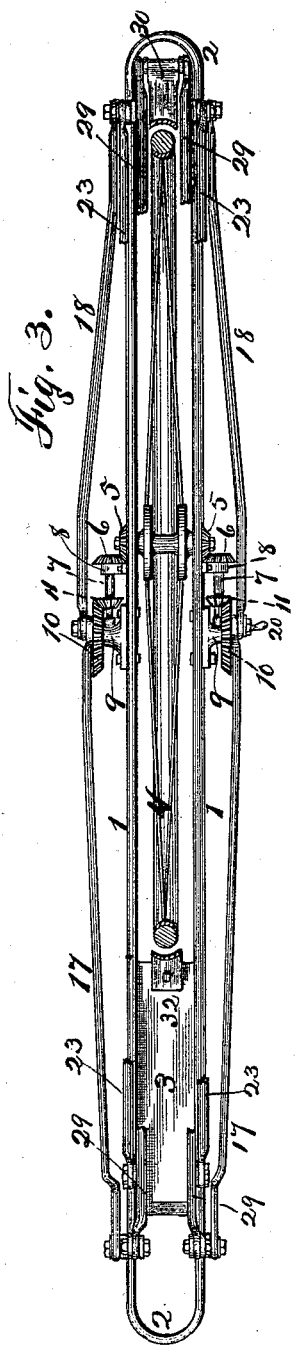
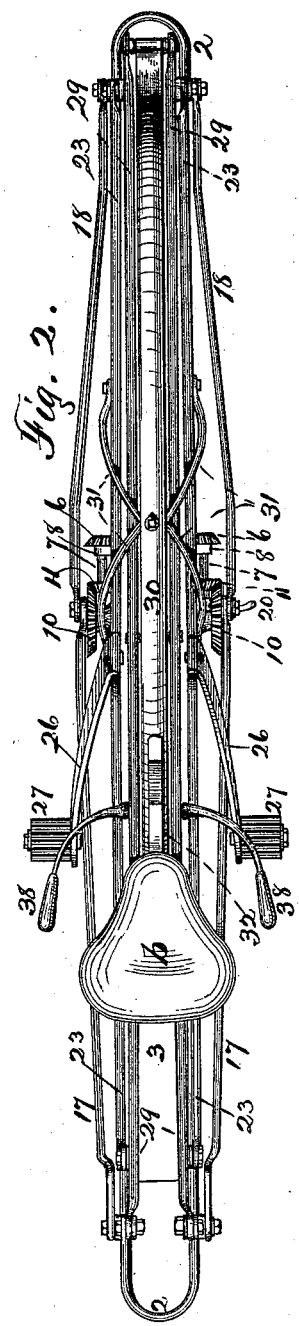
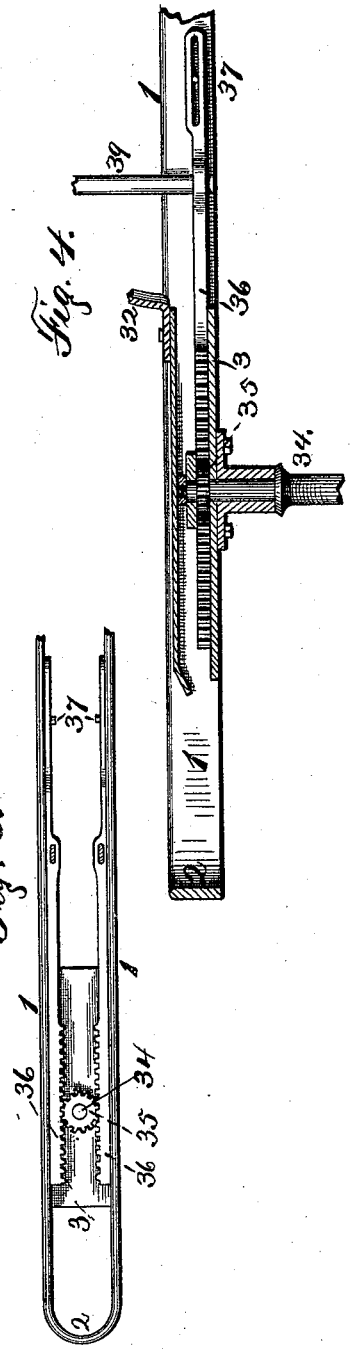
WITNESSES:
Herbert A. Carhart,
C. B. Kinne
INVENTOR.
Andrew W. Dunn
BY
Smith & Denison
ATTORNEYS (No Model.) 3 Sheets—Sheet 3.
A. W. DUNN.
BICYCLE.
No. 478,156. Patented July 5, 1892.
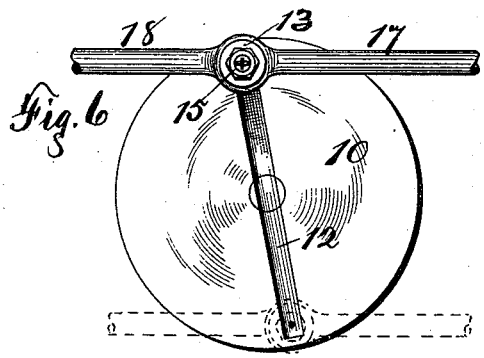
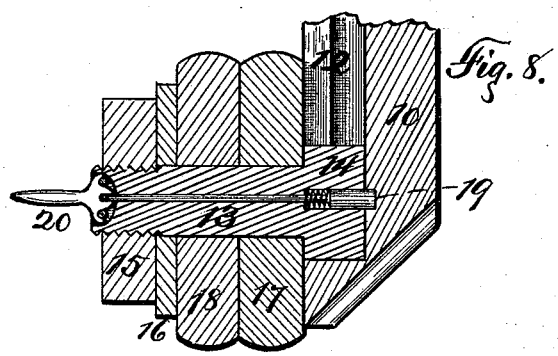
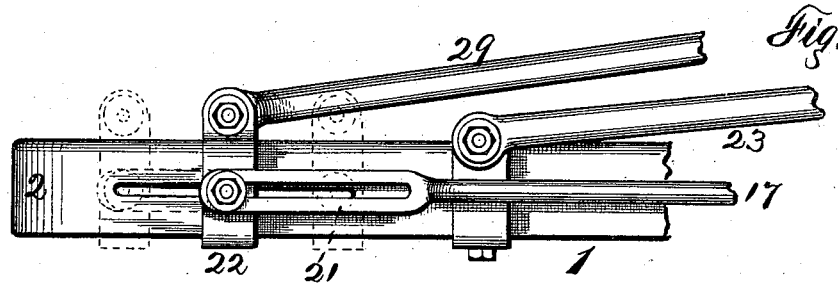
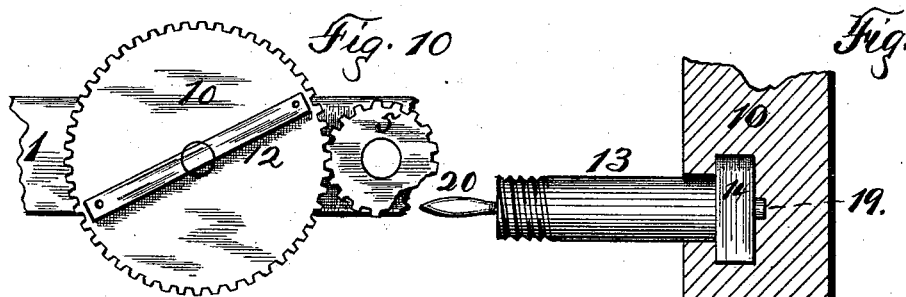
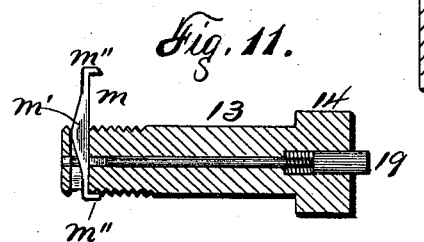
WITNESSES:
Herbert A. Carhart
C. B. Kinne
INVENTOR.
Andrew W. Dunn
BY
Smith & Denison
ATTORNEYS

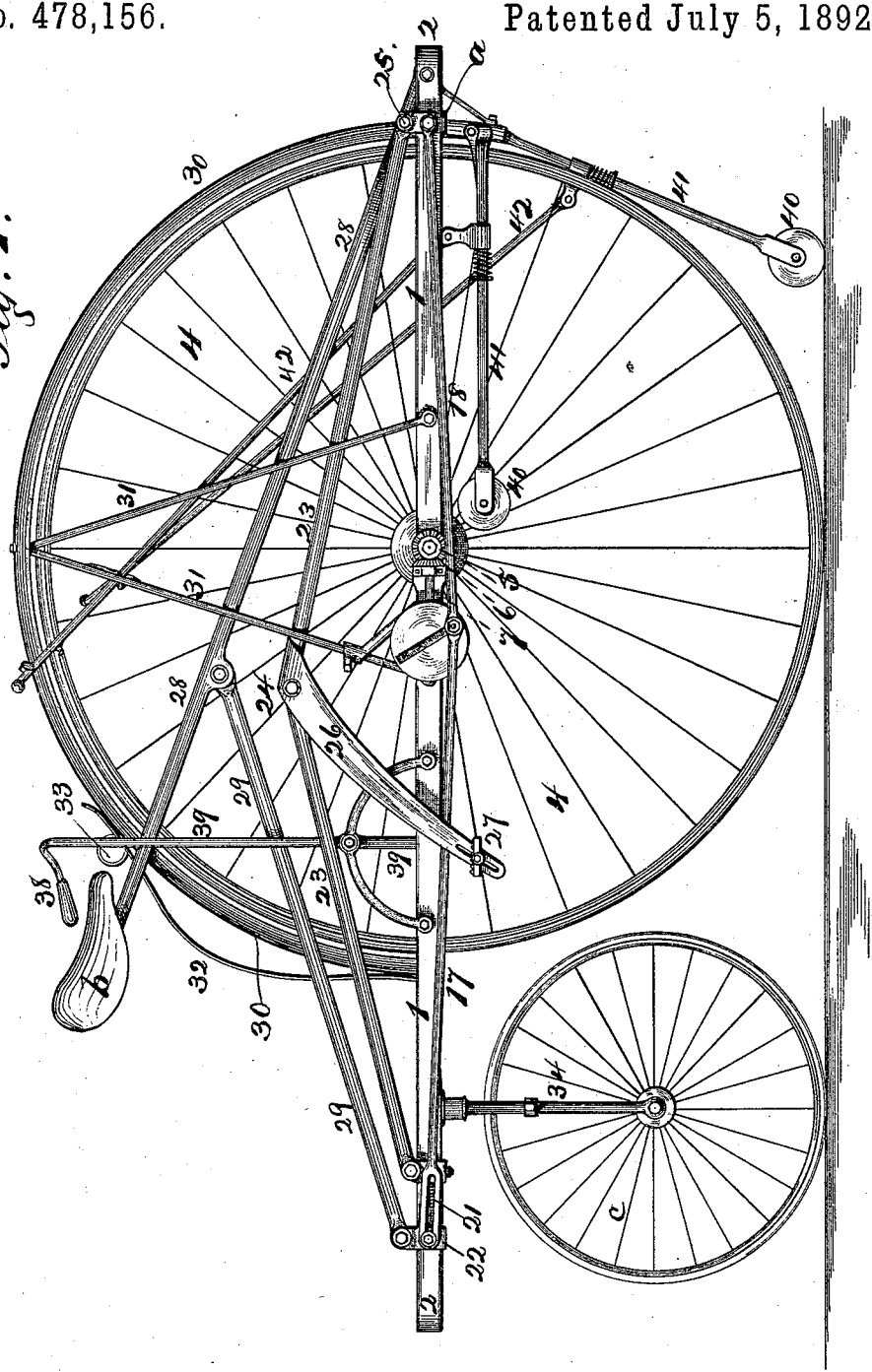

UNITED STATES PATENT OFFICE.

ANDREW W. DUNN, OF PULASKI, NEW YORK.

BICYCLE.

SPECIFICATION forming part of Letters Patent No. 478,156, dated July 5, 1892.

Application filed September 14, 1891. Serial No. 405,661. (No model.)

*To all whom it may concern:*

Be it known that I, ANDREW W. DUNN, of Pulaski, in the county of Oswego, in the State of New York, have invented new and useful Improvements in Bicycles, of which the following, taken in connection with the accompanying drawings, is a full, clear, and exact description.

My invention relates to velocipedes, and particularly to that class in which the saddle is adapted to be moved vertically by the operation of the vertically-operated pedals, rising and falling simultaneously with the pedals, the saddle rising as the pedals are depressed and falling as the pedals rise.

My object is to produce an improved velocipede in which the weight of the rider is automatically removed from the saddle and thrown upon the pedals during their downward movement, and then as the pedals reverse is automatically removed from them and transferred back again to the saddle, so that thereby the weight of the rider is automatically applied to the operation of the pedals in driving the machine and is automatically removed therefrom when not needed as propelling-power, so that I thereby obtain the maximum of power in propelling and the minimum of restraint to the return of the pedals to the top of their upward stroke.

My invention consists in the several novel features of construction and operation hereinafter described, and which are specifically set forth in the claims hereunto annexed. It is constructed as follows, reference being had to the accompanying drawings, in which—

Figure 1 is a side elevation of the machine complete. Fig. 2 is a top plan view thereof. Fig. 3 is a top plan of the machine with the seat-bars and pedal-bars broken off and the wheel-guard and part of the wheel removed, showing especially the frame, the driving-crank rods, and the drive-gear. Fig. 4 is a sectional elevation of part of the main frame, steering-post, one of the steering rack-bars, the pinion, and shaft on top of the fork in which the steering is mounted. Fig. 5 is a top plan of part of the main frame, the steering-pinion, and the rack-bars in engagement therewith. Fig. 6 is a detail of the connection of the driving-crank rod to the drive-gear on one side of the machine. Fig. 7 is an enlarged detail of the pedal-rod connection to the frame at the rear, the connection of the movable seat-operating rod to the frame, and the connection of the drive-crank rod to the seat-rod, showing the extent of their reciprocation by the dotted lines. Fig. 8 is a transverse section of my mechanism by which I can shift the point of the connection of the drive-rod from one side of the drive-gear to the opposite side. Fig. 9 is a sectional elevation of the crank-pin, part of the gear, its slot-way, the head of the crank-pin therein, and the locking pin and lever. Fig. 10 is a plan view of an ordinary spur-gear, as the driving-gear, meshing with a smaller pinion upon the main shaft to multiply the power, instead of the bevel-gearing shown in the other figures. Fig. 11 is a vertical longitudinal sectional elevation of the crank-pin, locking-bolt, and the preferred means for unlocking the bolt to permit the crank-pin to traverse the drive-gear when I desire to change the pedal action.

The main frame consists of the side rails 11, Fig. 3, the end connections 2 2, and the bottom 3, adjacent to the rear end of the frame. The axle of the front or large wheel 4 is journaled in these side rails, the wheel itself being of any ordinary construction. Upon the outer ends of this axle I secure the bevel-pinions 5, and pinions 6 mesh therewith, being secured upon a shaft 7, journaled in bearings 8 and 9, erected upon the side rails, and 10 is the drive-gear meshing with the bevel-pinion 11 upon the shaft 7. The outer face of this drive-gear is grooved diametrically, as at 12, either with a plain or a dovetailing groove, and 13 is the crank-pin, the head 14 of which fits in said groove and its outer end is threaded to receive the nut 15 and washer 16, thereby securing the pitman-rod, consisting of the sections 17 and 18, upon the pin.

In Fig. 8 I show a spring-bolt 19, inserted through the crank-pin and engaging with a hole in the bottom of the groove 12 and locking the crank-pin therein, the outer end of said bolt being connected to a crank-arm 20, which has its bearing in the outer end of the pin, said crank normally projecting in line with said pin and when pushed down operating to draw the bolt back and release the crank-pin, so that it can be easily moved in said groove and be again locked as soon as the bolt meets another bolt-hole therein. The outer end of one pitman-section 18 is pivotally connected to the slide $a$ upon the side rail, which fits over it and traverses it. The outer end of the other pitman-section 17 is slotted, as at 21, and pivotally connected to the slide 22, which fits over and slides freely upon the side rail and traverses it with each rotation of the drive-gear.

The treadle mechanism comprises the treadle-bar 23 in sections hinged together at 24, its front end being pivoted to the slide $a$ at 25 and its rear end being pivotally connected to the side rail inside of the slide 22, and 26 is the pedal-arm, secured to the treadle-bar at or near the hinge therein and standing downward and outward and at the lower end provided with the adjustable pedal 27, so that the vertical movement of the pedal gives like movement to the treadle-frame and causes the slide to traverse the side rail, operate the crank-rod, and actuate the drive-gearing. This mechanism is the same on both sides of the frame, and when the crank-pins are at the same ends of the slots in the drive-gears then both treadle-frames move up or down simultaneously, and when one crank-pin is at the opposite end of said slot from the other pin then these frames alternate in their vertical movements; but this latter motion is only used when the saddle is made stationary, as hereinafter described.

The saddle-frame comprises two rails 28, one on each side of the wheel and extending forward and downward and having their front ends pivotally secured to the connecting-rods 29, having their outer ends pivotally connected to the slide 22 and their inner ends hinged to the rails 28. The saddle $b$ is mounted upon the inner ends of the rails, substantially as shown in Fig. 1. A wheel-guard 30 extends over the top of the wheel and is supported at its ends by the main frame and centrally by the braces 31, connected to it and to said frame. A spring 32 has its lower end secured to the main frame contiguous to the guard and thence extends upward, substantially as shown in Fig. 1, and near its upper end is coiled, as at 33, its upper end resting against the guard. The rear or small wheel is the steering-wheel, and it is mounted as a caster-wheel, the upper end of the wheel-fork 34 passing upward through the bottom of the main frame and being there provided with a pinion 35, which is in engagement with the sliding rack-bars 36, which lie upon the bottom of the frame, Figs. 4 and 5, and their front ends are connected to said frame by the slot-and-pin connection 37. Independent steering-handles 38 are connected by the vertical shafts 39 and crank-arms thereon (not shown) or similar mechanism to each of the sliding rack-bars, so that when a handle is moved forward or back its rack-bar is moved in the opposite direction, the pinion 35 is rotated, and the steering-wheel turned. When desired, I can also use a supporting and steadying mechanism comprising the auxiliary wheels 40, journaled in legs 41, which are hinged to a post extending down from the main frame, and 42 are pull-rods, one for each leg and connected thereto by a pivotal or hinge joint, so that when pushed down the wheels are brought down upon the ground, and an ordinary catch upon one of the guard-braces holds each pull-rod and through it each leg and wheel, and in like manner when pulled up the legs and wheels are supported below the main frame. When these legs are set at an angle and as they are lowered, the wheels will stand on each side of the main wheel, and thus support the machine when not in use or steady it when used by beginners.

As shown in Fig. 1, and assuming that both of the crank-pins 13 are in the same end of the slot in the drive-gear, then both treadle-bars 23, slides $a$, and pitman-rods 18 move simultaneously to rotate the drive-gears simultaneously. As these rotate, the pitman-sections 17 cause the slides 22 to traverse the side frame-bars and through the rods 29 alternately raise and lower the rails 28 and the saddle thereon. The result of this saddle movement is that the seat raises with the downward movement of the pedals and treadle-frame, so that the whole weight of the rider is thrown onto the pedals, and when they reach the limit of their downward stroke and the crank-pins pass the center then the seat is raised, catches the weight, and removes it from the pedals, all automatically, and this enables the rider to easily attain great speed with the minimum of exertion and actual leg-work. At the same time the movement is very similar to horseback-riding. As the seat is lowered it engages with the swell of the spring 32 and is cushioned thereon, thus removing all jolt or jar incident to the reversal of its movement, the spring of the rails 28 operating to take up the ordinary jolting and jarring incident to the roughness of the road. When I do not wish to utilize this saddle movement and desire to have it stationary, I raise it until it rests upon the coil 33, throwing the spring back, if necessary, which draws the slide 22 forward, so that the rod 17 will then reciprocate without moving the slide, and by operating the lever 20 and unlocking the crank-pin on one side shift this crank-pin to the other end of the slot in its drive-gear, and then I can operate the pedals alternately, and the spring 32 will operate directly as a saddle-supporting spring.

I do not limit myself to the use of the train of gearing shown, as I can omit it and connect the pitman-crank direct to the axle of the main wheel.

As the projection of the lever 20 might be objectionable, I have adapted the mechanism shown in Fig. 11 to operate the locking-bolt 19 in the crank-pin 13, consisting in providing said crank-pin with a vertical mortise, and the bolt-shank also, through which I insert the shifter $m$, provided on one edge with the wedgingfaces $m'$ and on its ends with beads $m''$, so that when pushed down by the foot it will wedge back the bolt and release the crank-pin, which will then traverse the drive-gear until the bolt again snaps into the locking-hole, the shifter having then substantially the position shown. By operating this with one foot I can change the pedal action while the machine is running.

What I claim as my invention, and desire to secure by Letters Patent, is—

1. The combination, with the main frame and the propelling-wheel journaled therein, of the vertically-movable treadle-frame carrying the pedals and pivotally connected at one end to the frame and at the other to slides upon the side bars of the frame, and pitman-rods connecting said slides to the crank-pins of the wheel-propelling mechanism.

2. The combination, with the main frame, the propelling-wheel, and the saddle, of the vertically-movable treadle-frame carrying the pedals and pivotally connected at one end to the frame and at the other to slides upon the side bars of the frame, and pitman-rods connecting said slides to the driving-crank pins, and the saddle-frame comprising the saddle-rails pivotally connected at one end to the main frame, the connecting-rods hinged at one end to the rails and at the other to slides upon the side bars, and the pitman-rod extensions connecting the latter slides to said crank-pins.

3. In a velocipede, a saddle mounted upon a vertically-movable frame, which is mounted upon the main frame, and a vertically-movable treadle-frame mounted upon the main frame, and pitman-rods connecting the treadle and saddle frames to the drive-crank pin, in combination.

4. In a velocipede, a main frame, a caster-wheel journaled in a yoke, a pinion upon the top of said yoke, rack-bars in said frame engaging with the pinion, and crank-handle bars engaging with said rack-bars, in combination, as set forth.

5. In a velocipede, a drive-wheel provided with a groove across its face, a crank-pin mounted in said groove, a spring-bolt through the crank-pin engaging with the drive-wheel, and a crank-lever connected to the outer end of said bolt, in combination, as set forth.

6. In a velocipede, a main frame, a saddle-carrying frame mounted thereon, a treadle-frame also mounted upon the main frame, and a pitman-rod connecting the treadle-frame to the drive-crank pin and to the saddle-frame, whereby the free end of the saddle is moved vertically when said treadle-frame is operated, in combination, as set forth.

In witness whereof I have hereunto set my hand.

ANDREW W. DUNN.

In presence of—
HOWARD P. DENISON,
C. B. KINNE.